(12) United States Patent
Morris et al.

(10) Patent No.: US 6,697,112 B2
(45) Date of Patent: Feb. 24, 2004

(54) IMAGING SYSTEM HAVING MULTIPLE IMAGE CAPTURE MODES

(75) Inventors: Tonia G. Morris, Chandler, AZ (US); Kevin M. Connolly, Chandler, AZ (US); James E. Breisch, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/193,961

(22) Filed: Nov. 18, 1998

(65) Prior Publication Data

US 2003/0164884 A1 Sep. 4, 2003

(51) Int. Cl.⁷ .......................... H04N 3/14; H04N 5/335
(52) U.S. Cl. .................. 348/302; 348/297; 257/229
(58) Field of Search .......................... 348/302, 303, 348/304, 297, 362; 257/229

(56) References Cited

U.S. PATENT DOCUMENTS 6,191,408 B1 * 2/2001 Shinotsuka et al. ...... 250/208.1
6,323,479 B1 * 11/2001 Hynecek et al. ......... 250/214 L

FOREIGN PATENT DOCUMENTS

| EP | 0 793 380 A2 | 9/1997 |
| EP | 0 858 212 A1 | 8/1998 |
| FR | 2 751 823 | 1/1998 |
| WO | WO 90/01844 | 2/1990 |
| WO | WO 97/09819 | 3/1997 |

* cited by examiner

*Primary Examiner*—Wendy R. Garber
*Assistant Examiner*—Matthew L Rosendale
(74) *Attorney, Agent, or Firm*—Trop, Pruner & Hu, P.C.

(57) ABSTRACT

An imaging system includes an array of pixel sensors and a mode control circuit. The array of pixel sensors is adapted to furnish logarithmically encoded indications of light intensities during a first mode and furnish linearly encoded indications of the light intensities during a second mode. The mode control circuit is adapted to selectively place the array in one of the first and second modes. The imaging system may include more than one array, and the mode control circuit may configure one of the arrays. The imaging system may include a camera, for example, that includes the array(s) and mode control circuit.

8 Claims, 7 Drawing Sheets

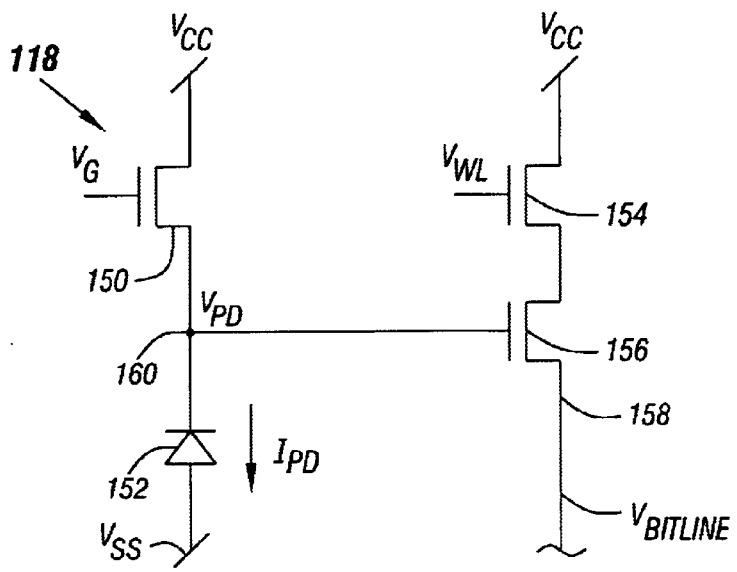
FIG. 4
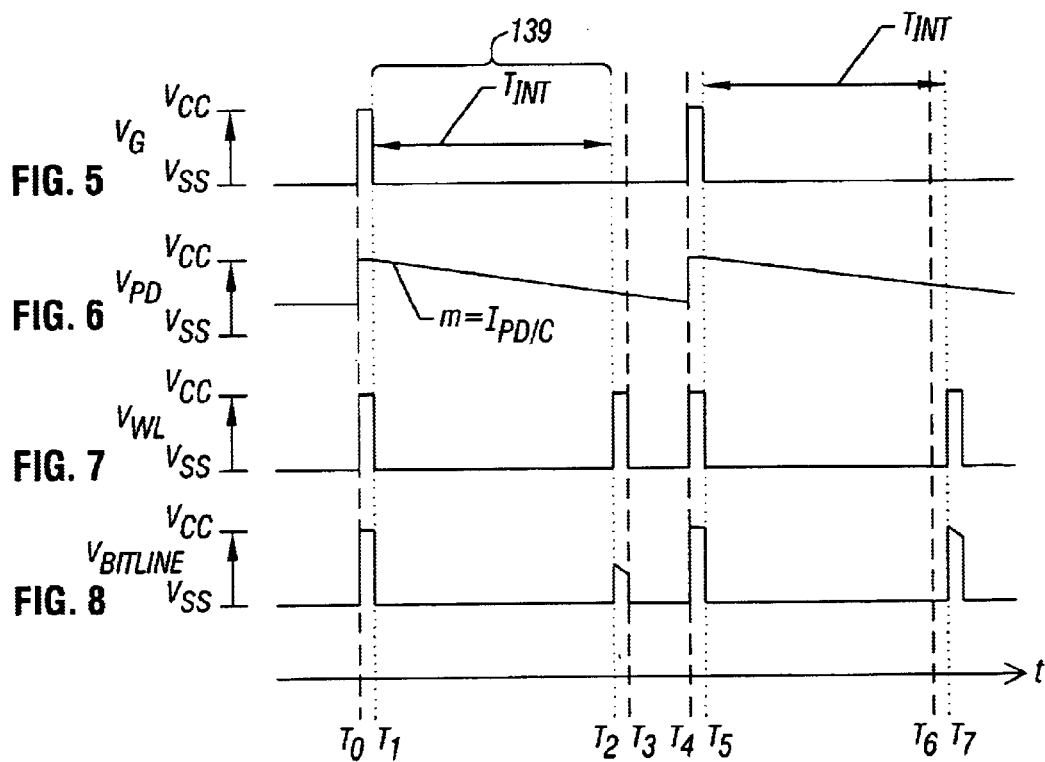

IMAGING SYSTEM HAVING MULTIPLE IMAGE CAPTURE MODES

BACKGROUND

The invention relates to an imaging system having multiple image capture modes.

Referring to FIG. 1, a digital imaging system 7 may include a digital camera 12 that has an image sensor, or imager 18, to electrically capture an optical image 11. To accomplish this, the imager 18 typically includes an array 13 (see FIG. 2) of photon sensing, pixel sensors 20 that are arranged in a focal plane onto which the image 11 is focused. For an imager that provides linearly encoded indications of the intensities of the captured image (hereinafter called a "linear imager"), during an integration time, or interval, each pixel sensor 20 typically accumulates photons of light energy of a portion, or pixel, of a representation of the image 11 that is focused (by optics in the camera 12) onto the focal plane. At the expiration of the integration interval, each pixel sensor 20 indicates (via an analog voltage, for example) the accumulated charge (for the associated pixel) that, in turn, indicates an intensity of a portion of the pixel area.

The camera 12 typically processes the indications from the pixel sensors 20 to form a frame of digital data (which digitally represents the captured image) and transfers the frame (via a serial bus 15, for example) to a computer 14 for processing. For video, the camera 12 may successively capture several optical images and furnish several frames of data, each of which indicates one of the captured images. The computer 14 may then use the frames to recreate the captured video on a display 9.

Referring to FIG. 2, the sensors 20 may be arranged, for example, in rows and columns. This arrangement allows column 22 and row 24 decoders to selectively retrieve the analog pixel values from the sensors 20 after the capture of the image 11. The decoders 22 and 24 route the selected pixel values to column decoder and signal conditioning circuitry 22 that might include, for example, analog-to-digital converters (ADCs) and circuitry to compensate for noise and/or nonlinearities that are introduced by the sensors 20. The circuitry 22 may furnish the resultant data signals to an input/output (I/O) interface 28 which includes circuitry for interfacing the imager 18 to other circuitry of the camera 12. A control unit 30 may coordinate the above-described activities of the imager 18.

For a linear imager, the duration of the integration interval determines how long the pixel sensors 20 sense, or are exposed to, the optical image 11. In this manner, if the duration of the integration interval is too short, the pixel sensors 20 may be underexposed, and if the duration is too long, the pixel sensors 20 may be overexposed. To set the correct exposure, the camera 12 may control the duration of the integration interval based on the camera's measurement of the brightness of the optical image 11. In this manner, for bright lighting conditions, the camera 12 typically uses a shorter duration (to prevent overexposure of the pixel sensors 20) than for low lighting conditions (to prevent underexposure of the pixel sensors 20). The camera's assessment of the brightness may occur, for example, during a calibration, or premetering, mode of the camera 12.

The intensities that are captured by the imager 18 may span a range of available intensity values called an available dynamic range. If the intensity levels are distributed over a large portion of the available dynamic range, then the image appears more vivid than if the intensity levels are distributed over a smaller portion of the available dynamic range.

The type of imager may govern the boundaries of the available dynamic range. For example, the linear imager captures intensities over a dynamic range that is suitable for capturing photographs. Another type of imager may provide logarithmically encoded indications of the intensities of the captured image (hereinafter called a "logarithmic imager"). The logarithmic imager typically captures intensities over a much larger dynamic range than the linear imager.

Due to its ability to capture intensities over a large dynamic range and other factors, a logarithmic imager typically is better suited for object recognition applications (machine vision applications, for example) than the linear imager, and conversely, because of its noise rejection capabilities and other factors, a linear imager typically is better suited to capture photographs than the logarithmic imager. As a result, the two types of imagers typically may not be interchanged for specific applications. Therefore, a camera that uses a logarithmic imager typically is not optimized to take photographs, and a camera that uses a linear imager typically is not optimized for machine vision applications.

Thus, there exists a continuing need for an imaging system to address one or more of the problems stated above.

SUMMARY

In one embodiment, a method for use with an array of pixel sensors includes receiving an indication of one of a plurality of image capture modes for the array. The array is configured to be in the indicated mode.

In another embodiment, an imaging system includes an array of pixel sensors and a mode control circuit. The mode control circuit is adapted to receive an indication of one of a set of image capture modes for the array and configure the array based on the indication.

In another embodiment, an imaging system includes an array of pixel sensors and a mode control circuit. The array is adapted to furnish logarithmically encoded indications of light intensities during a first mode and furnish linearly encoded indications of the light intensities during the second mode. The mode control circuit is adapted to selectively place the array in one of the first and second modes.

In yet another embodiment, an imaging system includes at least one array of pixel sensors and a circuit. The circuit is coupled to the array(s) and adapted to receive an indication of a selected image capture mode out of a group of image capture modes and use the array(s) to provide second indications of an image captured in accordance with the selected image capture mode.

BRIEF DESCRIPTION OF THE DRAWING

FIG. 4 is a schematic diagram of a pixel sensor of the imager of FIG. 3 according to an embodiment of the invention.

FIGS. 5, 6, 7 and 8 are voltage waveforms illustrating operation of the imager of FIG. 3 when the imager is placed in a linear capture mode.

DETAILED DESCRIPTION

Figure 1:
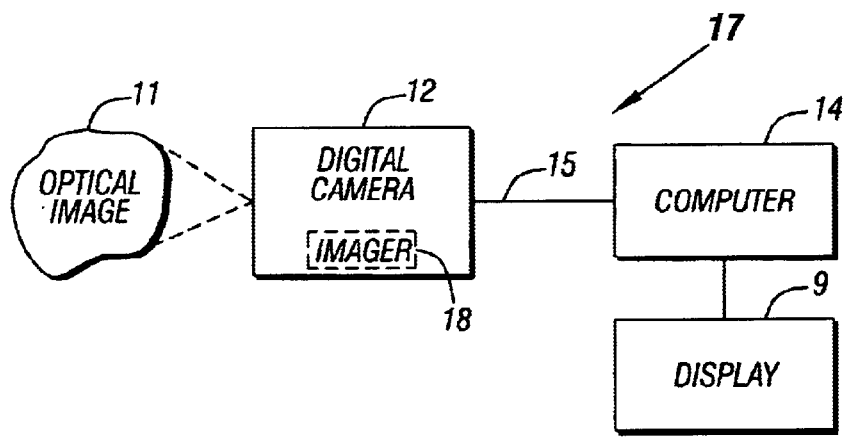
FIG. 1 is a schematic diagram of a digital imaging system of the prior art.
Figure 2:
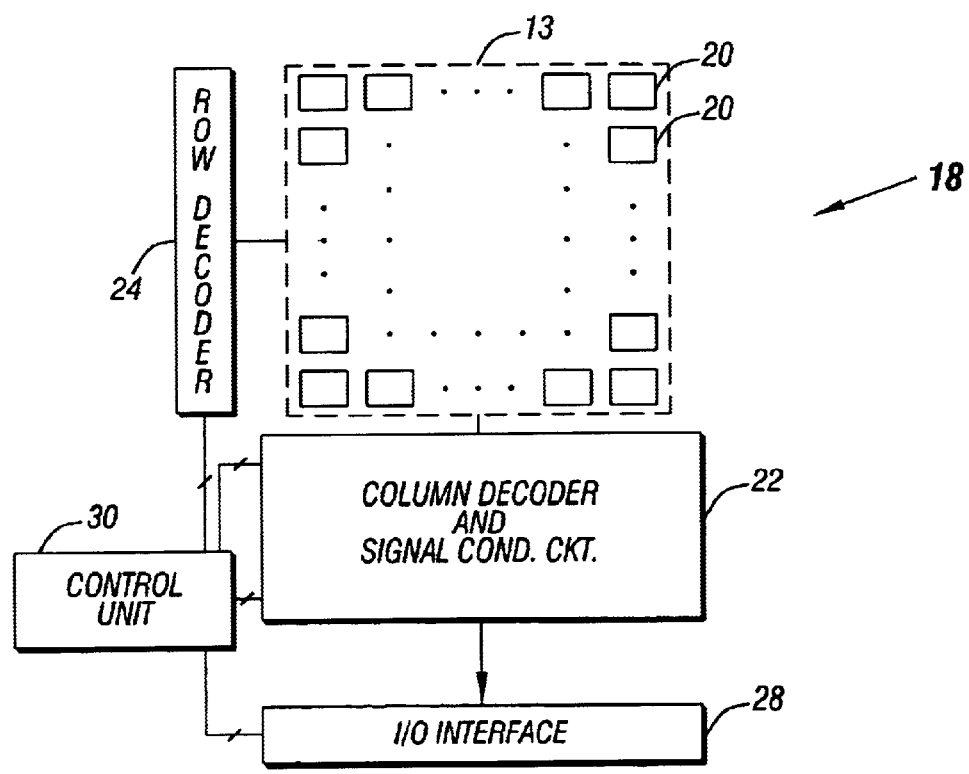
FIG. 2 is a schematic diagram of an imager of the camera of FIG. 1.
Figure 3:
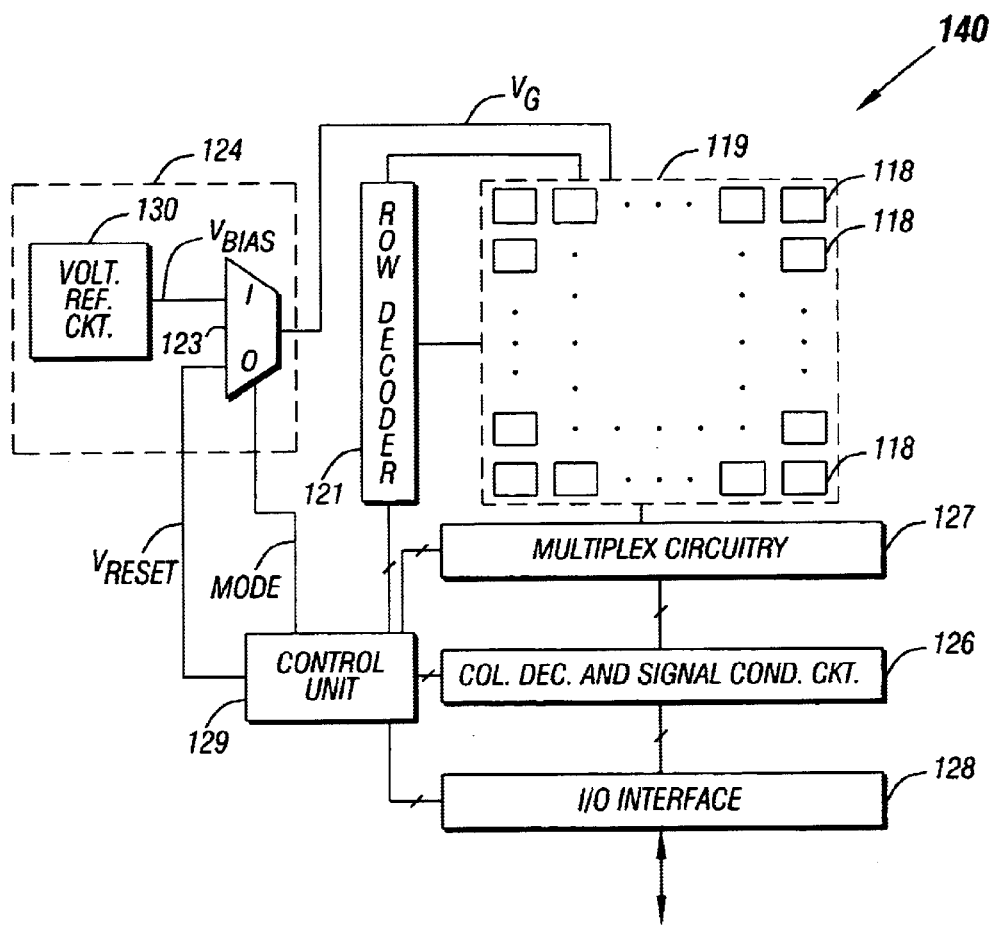
FIG. 3 is a schematic diagram of an imager according to an embodiment of the invention.
Figure 9:
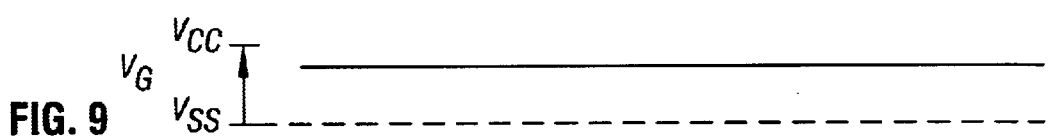
FIGS. 9, 10, 11 and 12 are voltage waveforms illustrating operation of the array of FIG. 3 when the imager is placed in a logarithmic capture mode.
Figure 10:
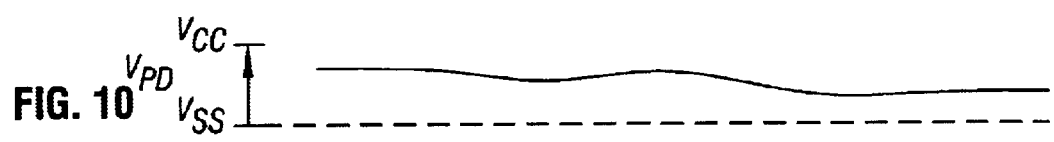
Figure 11:
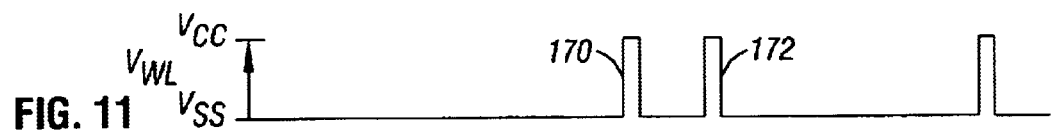
Figure 12:
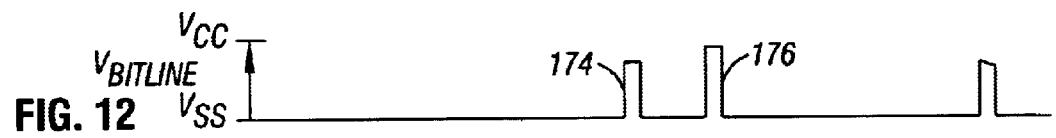

Referring to FIG. 3, an embodiment 140 of a digital imager in accordance with the invention includes an array 119 of pixel sensors 118 that are located in a focal plane onto which optical images to be captured are focused. In this manner, each pixel sensor 118 detects an intensity of light that strikes a portion, or pixel, of the focal plane. In some embodiments, the imager 140 may include a mode control circuit 124 to place the array 119 in one of at least two different image capture modes, a feature that permits the array 119 to be used in numerous applications that require different available dynamic ranges.

For example, in some embodiments, a digital camera may use the imager 140 to capture optical images, and the mode control circuit 124 may configure the array 119 to be either in a logarithmic mode or a linear mode. In this manner, in the logarithmic mode, the array 119 provides logarithmically encoded indications of pixels of a captured image to effectively cause the imager 140 to be a logarithmic imager. In the linear mode, the array 119 provides linearly encoded indications of pixels of a captured image to effectively cause the imager 140 to be a linear imager. As a result of this arrangement, a camera that includes the imager 140 may be used for both machine vision and photographic applications, as examples.

As another example of the use of the imager 140 with a camera, the imager 140 may be used in more than one mode for purposes of capturing and enhancing a photograph. For example, the array 119 may capture a snapshot of an image when configured in the logarithmic mode and capture another snapshot of the image when configured in the linear mode. As an example, the camera may use the resultant linearly captured frame to form the basic photograph and use the resultant logarithmically captured frame may to perform pre-metering or post-processing functions. For example, the logarithmically captured frame may be used to determine the integration time for the linear capture of the image. As another example, the logarithmically captured frame may be used to determine when a particular linearly captured pixel value is saturated, and if this is the case, the corresponding logarithmically captured pixel value may be substituted in place of the linearly captured pixel value.

Thus, the advantages of the above-described arrangement may include one or more of the following: a single imager may have multiple image capture modes; a camera that incorporates the imager may be used for different imaging applications that require distinctly different available dynamic ranges, such as machine vision and photographic applications; and a camera that incorporates the imager may use the different modes to perform pre-metering and post-processing functions. Other advantages may be possible.

In some embodiments, the imager 140 may include a control unit 129 that may, via an input/output (I/O) interface 128, receive a request to configure the array 119 to be in the logarithmic or linear modes, as examples. The imager 140 may be part of a digital camera, and the source of the request may be, as examples, a button on the camera or a computer that is coupled to the camera, as described below. In response to the request, the control unit 129, in some embodiments, may assert (drive high, for example) a logic signal (called MODE) to indicate the logarithmic mode and deassert (drive low, for example) the MODE signal to indicate the linear mode. In some embodiments, the mode control circuit 124 may configure the array 119 to be in the mode that is indicated by the MODE signal.

Referring to FIG. 4, in particular, the mode control circuit 124 may furnish a voltage (called $V_G$) that is provided by the mode control circuit 124. In this manner, in some embodiments, each pixel sensor 118 may include an n-channel, metal-oxide-semiconductor field-effect transistor (MOSFET) 150 that receives the $V_G$ voltage at its gate terminal. The $V_G$ voltage, in turn, controls whether the pixel sensor 118 linearly or logarithmically indicates the intensity of an associated pixel. The pixel sensor 118 may also include a photosensitive element, such as a photodiode 152, that conducts a current (called $I_{PD}$) in response to photons of energy received from the associated pixel of the image being captured. In some embodiments, the cathode of the photodiode 152 is coupled to a source terminal of the MOSFET 150 and also serves as a sampling node 160 for the pixel sensor 118. The sampling node 160 provides a voltage (called $V_{PD}$) that indicates the intensity of the pixel. The anode of the photodiode 152 may be coupled to a negative voltage supply level (called $V_{SS}$, as shown) or ground. A significant parasitic capacitor (not shown) may be present between the sampling node 160 and ground and influence the response of the pixel sensor 118, as described below. The capacitance of this parasitic capacitor may be generally attributable to the gate capacitance of the MOSFET 156 and the capacitance of the photodiode 152. The drain terminal of the MOSFET 150 may be coupled to a positive voltage supply level (called $V_{CC}$).

Each pixel sensor 118 provides an indication of the measured pixel intensity to an associated bitline 158. In particular, the indication in some embodiments, may be provided by the $V_{PD}$ voltage that is sampled (as described below) to furnish a voltage (called $V_{BITLINE}$) to the bitline 158. For purposes of sampling the $V_{PD}$ voltage, the pixel sensor 118 may include an n-channel MOSFET 156 that functions as a source follower. In this manner, the MOSFET 156 has a gate terminal coupled to the node 160, a source terminal coupled to the bitline 158 and a drain terminal operatively coupled to the $V_{CC}$ positive voltage supply level. Another n-channel MOSFET 154 may have its drain-source path coupled in series with the drain-source path of the MOSFET 156 and function to turn on and off the sampling of the $V_{PD}$ voltage. When a voltage (called $V_{WL}$) of the gate terminal of the MOSFET 154 is asserted (driven high, for example), the MOSFET 154 conducts which causes the MOSFET 156 to conduct and furnish an indication of the $V_{PD}$ voltage to the bitline 158. As shown, in some embodiments, the drain-source path of the MOSFET 154 is coupled between the $V_{CC}$ positive supply voltage level and the drain terminal of the MOSFET 156. However, in other embodiments, the drain-source path of the MOSFET 154 may be coupled between the source terminal of the MOSFET 156 and the bitline 158.

Referring to FIGS. 5, 6, 7 and 8, the pixel sensor 118 may operate in the following manner when the array 119 is configured to be in the linear mode. In particular, each pixel sensor 118 measures the intensity of the associated pixel using integration intervals (the integration interval from time $T_1$ to time $T_2$ and the integration interval from time $T_5$ to time $T_6$, as examples), each of which is denoted by $T_{INT}$ in FIG. 5. Before the beginning of an exemplary integration interval 139, the mode control circuit 124 initializes the pixel sensor 118 by briefly asserting (driving high, for example) the $V_G$ signal (see FIG. 5) from time $T_0$ to time $T_1$. The asserted $V_G$ voltage, in turn, causes the MOSFET 150 to conduct and pull the $V_{PD}$ voltage (see FIG. 6) to an initial voltage that is approximately equal to the $V_{CC}$ supply voltage level less the threshold voltage of the MOSFET 150, as an example. To obtain an indication of the initial voltage of the $V_{PD}$ voltage (for purposes of later calculating the integrated intensity), a row decoder 121 (see FIG. 3) asserts the $V_{WL}$ voltage (see FIG. 7) for one row during the time interval from time $T_0$ to time $T_1$ to cause the MOSFETs 154 and 156 to conduct. At time $T_1$, the row decoder 121 deasserts (drives low, for example) the $V_{WL}$ voltage from time $T_1$ to time $T_2$ to turn off the MOSFETs 154 and 156 for the duration of the integration interval 139.

During the integration interval 139, the $I_{PD}$ current of the diode 152 depletes charge stored in the parasitic capacitor that is coupled to the sampling node 160. The depletion of the charge, in turn, causes a linear decline in the $V_{PD}$ voltage (see FIG. 6) pursuant to an approximate slope of $I_{PD}/C$, where "C" represents the capacitance of the parasitic capacitor. At the end of integration interval 139, the row decoder 121 asserts the $V_{WL}$ voltage from time $T_2$ to time $T_3$ to cause the MOSFETs 154 and 156 to conduct an indication (i.e., the $V_{BITLINE}$ voltage (see FIG. 8)) of the $V_{PD}$ voltage to the bitline 158. Thus, from the two sampled $V_{PD}$ voltages (one at the beginning of the integration interval and one at the end), the accumulated photons and thus, the intensity of the pixel may be determined.

The above example illustrates correlated double sampling of the $V_{PD}$ voltage during the linear mode. However, other embodiments are possible. For example, in some embodiments, the reset value of the $V_{PD}$ voltage that is used to calculate the accumulated photons of a particular integration interval may be the reset value from the next integration interval, as the reset value may not substantially vary between successive integration intervals.

Referring to FIGS. 9, 10, 11 and 12, for the logarithmic mode, the mode control circuit 124 sets the $V_G$ voltage (see FIG. 9) to a DC voltage level that places the MOSFET 150 in a subthreshold region in which the voltage-current relationship (i.e., the $V_{GS}$-$I_{PD}$ relationship) of the MOSFET 150 follows an exponential curve. As a result, the $V_{PD}$ voltage (see FIG. 10) provides a logarithmic indication of the intensity of the associated pixel.

In particular, the $V_{PD}$ voltage provides a near instantaneous representation of the intensity, delayed only by the (resistance-capacitance) R-C time constant of the pixel sensor 118, not the duration of the integration interval. As a result, only a small interval of time (approximately 0.3 milliseconds (ms), as a logarithmic example) may be required to capture an image for the logarithmic mode as compared to the linear mode. Therefore, as an example, two or more indications (shown by the pulses 170 and 172 of the $V_{WL}$ voltage shown in FIG. 11 and the resulting pulses 174 and 176 of the $V_{BITLINE}$ voltage shown in FIG. 12) of the incident intensity may be obtained in a time interval that is shorter than one linear mode integration interval.

Referring back to FIG. 3, in some embodiments, the imager 140 may function in the following manner to capture an image. In particular, regardless of the mode of the array 119, the pixel sensors 118 may require some time to indicate the captured image. After this time elapses, the row decoder 121 retrieves the indicated intensities from the pixel sensors 118 by selectively, electrically selecting (via the appropriate $V_{WL}$ voltage) rows of the pixel sensors 118. Once selected, the pixel sensor 118 transfers the indication of the sensed intensity (via the bitline 158) to signal conditioning circuitry 126. Column decoder and signal conditioning circuitry 126 may be used to select groups of the indications for each row.

The circuitry 126 may, for example, filter noise from the indications and convert the indications into digital data before transferring the data to an I/O interface 128. The I/O interface 128 may include buffers for temporarily storing data and circuitry to interface the imager 140 to external circuitry (other components of a digital camera, for example).

The imager 140 may also include multiplexing circuitry 127 to selectively route the indications from the pixel sensors 118 based on the image capture mode selected. For example, the circuitry 127 may select one portion of the circuitry 126 to handle the double correlated sampling performed during the linear image capture mode and select another portion of the circuitry 126 to handle the sampling during the logarithmic mode.

In some embodiments, the imager 140 may also include the control unit 129 that has circuitry such as state machines and timers to control the timing, retrieval of the indications from the array 119, control of the mode of the array 119 and the general data flow through the imager 140. The control unit 129 may furnish the MODE signal that the control unit 129 asserts (drives high, for example) to indicate the logarithmic mode and deasserts (drives low, for example) to indicate the linear mode. When the control unit 129 asserts the MODE signal (to indicate the logarithmic mode), the mode control circuit 124 sets the $V_G$ voltage to a predetermined DC voltage that places each MOSFET 150 in the subthreshold region. Similarly, when the control unit 129 deasserts the MODE signal (to indicate the linear mode), the mode control circuit 124 pulses the $V_G$ voltage at the appropriate times (as shown in FIG. 5) to control integration by the pixel sensors 118.

In some embodiments, the mode control circuit 124 (see FIG. 3) may include a multiplexer 123 that receives a DC voltage (called $V_{BIAS}$) at one input terminal and another voltage (called $V_{RESET}$) at another input terminal. The mode control circuit 124 may include a voltage reference circuit 130 that furnishes the $V_{BIAS}$ voltage and sets the $V_{BIAS}$ voltage at a level that is appropriate to place the MOSFETs 150 of the pixel sensors 118 in the subthreshold region during the logarithmic mode. The control unit 129 furnishes the $V_{RESET}$ voltage and pulses the $V_{RESET}$ voltage appropriately to control the on/off behavior of the MOSFET 150 during the linear mode. The multiplexer 123 furnishes the $V_G$ voltage at an output terminal and receives the MODE signal at a select terminal. In some embodiments, the control unit 129 pulses the $V_{RESET}$ voltage to capture an image in accordance with the linear mode regardless of whether the array 119 is configured to be in the logarithmic or linear mode, as the multiplexer 123 provides the appropriate $V_G$ voltage (i.e., the $V_{BIAS}$ or the $V_{RESET}$ voltage) to the MOSFETs 150.

Figure 13:
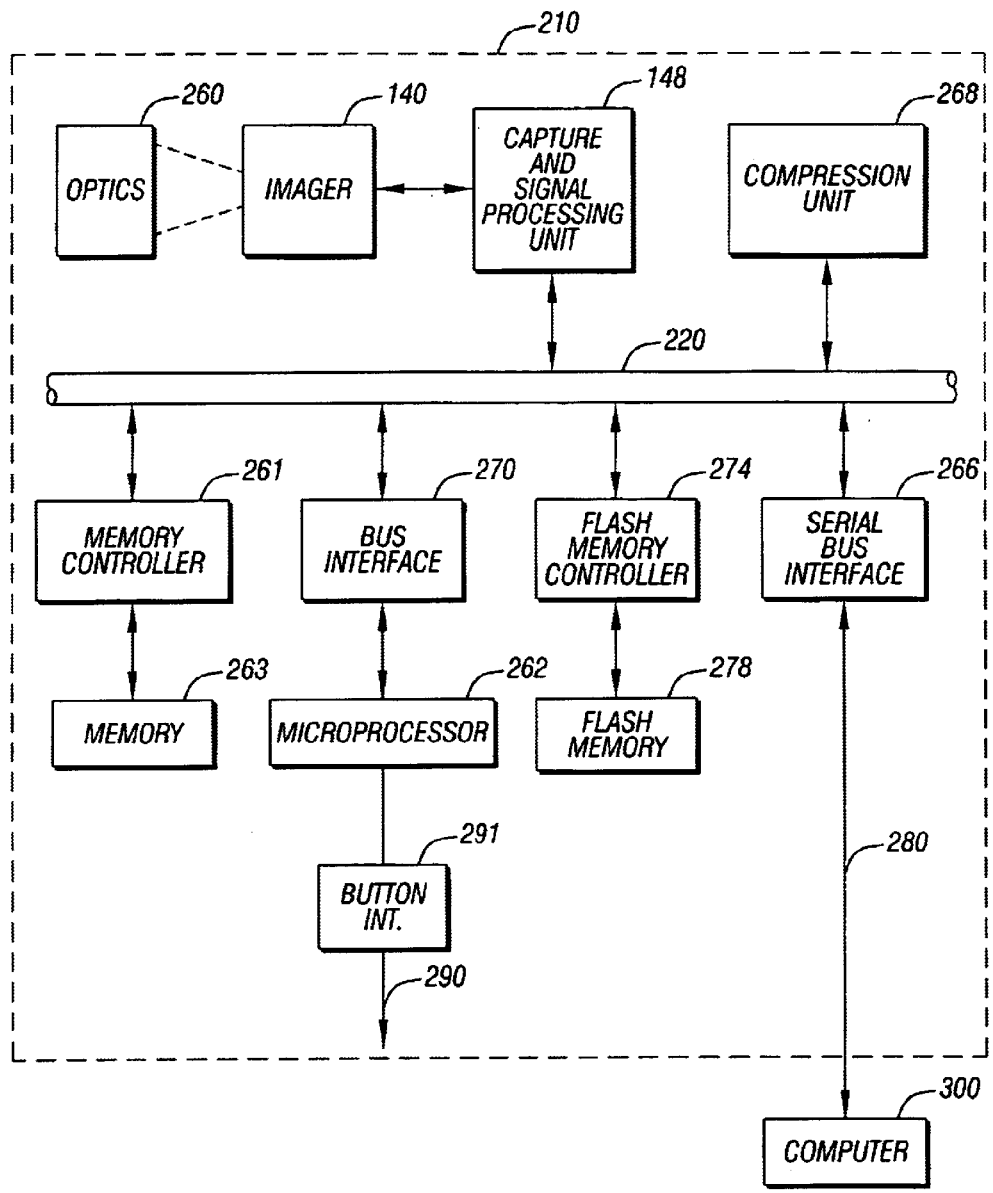
FIGS. 13, 14 and 15 are schematic diagrams of digital cameras according to embodiments of the invention.

For purposes of informing the control unit 129 as to the desired mode, the control unit 129 may receive requests from circuitry (described below) outside of the imager 140 via the I/O interface 128. For example, referring to FIG. 13, in some embodiments, the imager 140 may be part of a digital camera 210 that includes circuitry that interacts with the imager 140. Besides the imager 140, the camera 210 may include optics 260 to focus the optical image onto the focal plane of the imager 140. A capture and signal processing unit 148 may interact with the imager 140 to capture the pixel image and transfer a frame of data that indicates the pixel image to a random access memory (RAM) 263. To accomplish this, the capture and signal processing unit 148 may be coupled to a bus 220, along with a memory controller 261 that receives the frame from the bus 220 and generates signals to store the data in the memory 263.

The camera 210 may also include a compression unit 268 that may interact with the memory 263 to compress the size of the frame before storing the compressed frame in a flash memory 278. To accomplish this, the compression unit 268 may be coupled to the bus 220, along with a flash memory controller 274 that receives the compressed frame from the bus 220 and generates signals to store the data in the flash memory 278. To transfer the compressed frame to a computer, the camera 210 may include a serial bus interface 266 that is coupled to the bus 220 to retrieve the compressed frame from either the memory 263 or the flash memory 278. To accomplish this, the serial bus interface 266 generates signals on a serial bus 280 (a Universal Serial Bus (USB), for example) to transfer an indication of the compressed frame to a computer 300, for example. The USB is described in detail in the Universal Serial Bus Specification, Revision 1.0, published on Jan. 15, 1996, and is available on the internet at www.intel.com.

Circuitry external to the imager 140 may be the source of a request for the imager 140 to configure the array 119 in a particular image capture mode. For example, in some embodiments, the computer 300 may transmit a request to the camera 210 via the serial bus interface 266 to set the mode of the array 119, such as the linear mode or the logarithmic mode. A processor, or microprocessor 262 (a Pentium based microprocessor, an Advanced Risc Machine (ARM) microprocessor, an 80×86 processor or a microcontroller, as just a few examples), of the camera 210 may, for example, retrieve an indication of the request from the serial bus interface 266 and transmit an indication of the request to the imager 140.

In some embodiments, the source of the request to configure the array 119 in a particular image capture mode may come from circuitry of the camera 210, such as a switch or button 290 of the camera 210. As an example, the camera 210 may include a button interface 291 to indicate the status of the button 290 to the microprocessor 262. The microprocessor 262 may be coupled to the bus 220 through a bus interface 270.

In some embodiments, the request may be automatically generated. For example, for purposes of enhancing a captured photographic image, the camera 210 may capture an image two times, as described above: one time using the linear array and another time using the logarithmic array. In this manner, the microprocessor 262 may automatically generate the request to reconfigure the array 119 to capture the image a second time. As another example, in some embodiments, the microprocessor 262 may automatically generate the request to configure the array 119 in a particular mode based on one or more factors, such as lighting conditions, resolution, etc.

Other embodiments are within the scope of the following claims. For example, in some embodiments, the array may be placed in image capture modes other than the linear and logarithmic modes. As another example, the imager may be a part of imaging systems other than a camera, such as a scanner.

Figure 14:
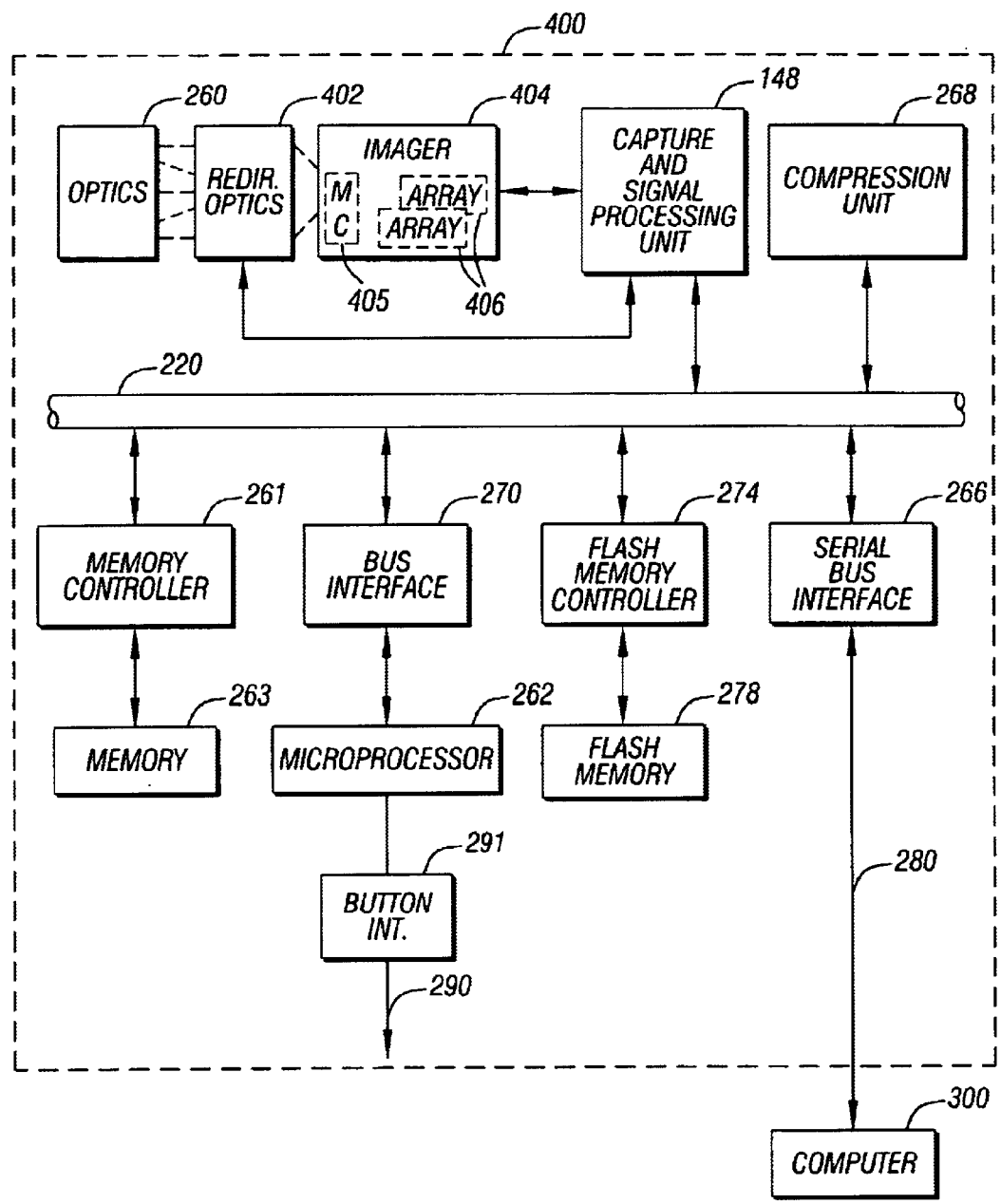

Referring to FIG. 14, as another example, the camera 210 may be replaced by a camera 400. The camera 400 has a similar design to the camera 210 with the differences being pointed out below. In particular, an imager 404 (that replaces the imager 140) of the camera 400 includes more than one array 406 of pixel sensors. In this manner, each array 406 may be configured in a different mode and selected based on the desired image capture mode. Thus, as an example, one of the arrays 406 may be configured in a linear mode and another one of the arrays 406 may be configured in a logarithmic mode. The mode of a particular array 406 may or may not be permanent (depending on the specific embodiment), as the mode of the particular array 406 may be reconfigured, as described above.

The electrical selection of the particular array 406 may be performed by a mode control circuit 405 (that replaces the mode control circuit 124 of the imager 140) of the imager 404. In this manner, the mode control circuit 405 may receive an indication of the selected mode (originating directly from a control unit (such as a control unit that is similar in some aspects to the control unit 129, for example) or indirectly from the microprocessor 262, as examples) and interact with multiplexing circuitry 405 of the imager 404 to select the appropriate array 406 based on the indication.

For purposes of focusing the image to be captured on the appropriate array 406, the camera 400 may include redirection optics 402 that direct the image from the optics 260 to the selected array 406. In some embodiments, the redirection optics 402 may include one or more galvanometer(s), for example, that control the positions of lenses and/or mirror of the redirection optics. The micro-galvanometer(s) may be controlled, for example, by the capture and signal processing unit 148 of the camera 400.

Figure 15:
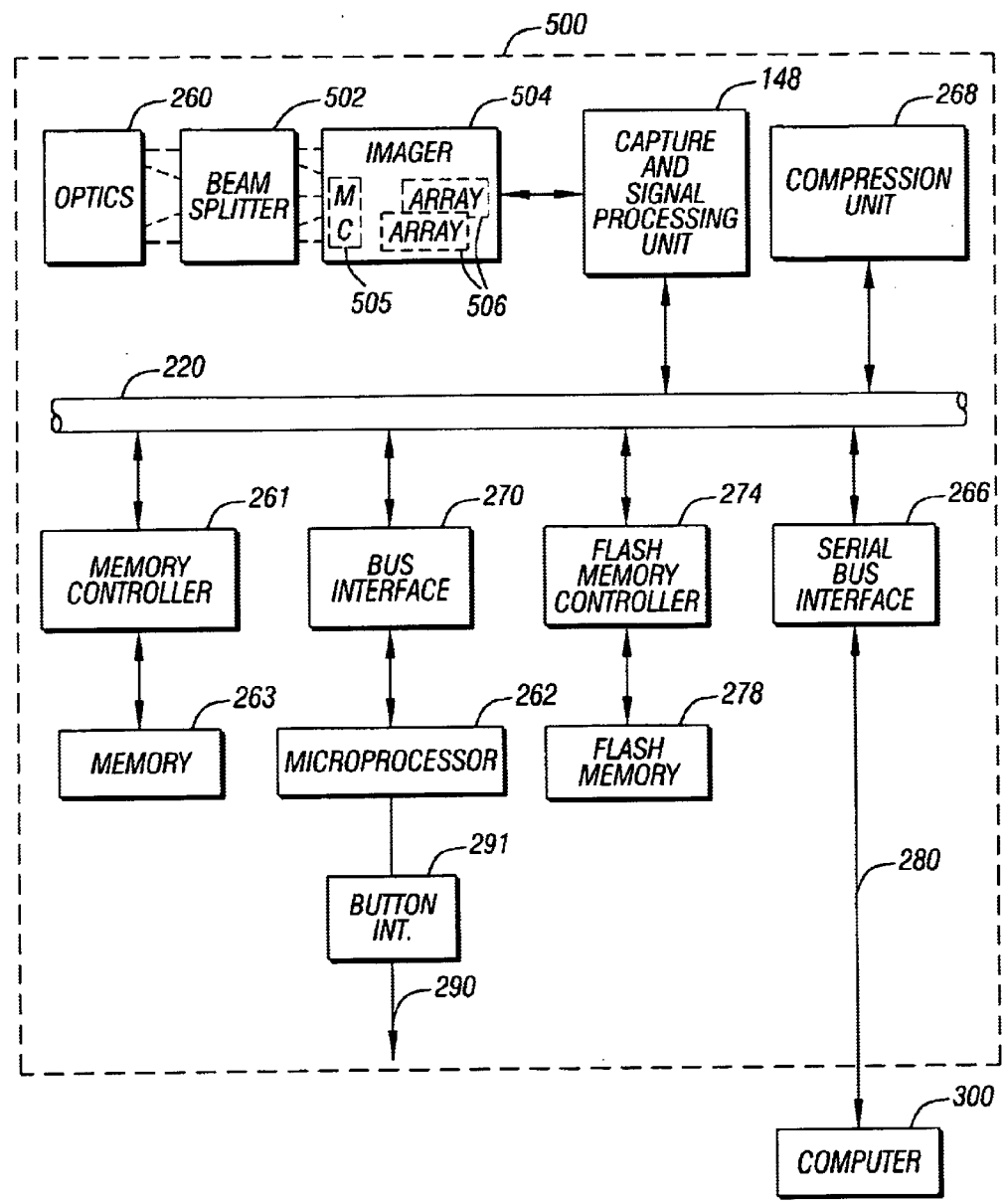

Referring to FIG. 15, as another example, the camera 210, 400 may be replaced by a camera 500 that includes an imager 504 having multiple pixel sensor arrays 506. In this manner, the arrays 506 may be configured to be in different modes. Thus, as examples, one array 506 may be configured in a linear image capture mode, and another array 506 may be configured in a logarithmic image capture mode. The camera 500 may include a beam splitter 502 that focuses reproductions of an optical image being captured onto the focal planes of the arrays 506. Multiplexing circuitry 505 of the imager 504 may select one or more of the arrays 506 for image capture and/or scanning purposes. Thus, as an example, the control unit (similar in some aspects to the control unit 129, for example) of the imager 504 may indicate a particular image capture mode, and the multiplexing circuitry 505 may selected the indications provided by one of the arrays 506 based on the selection by the control unit. The microprocessor 262, for example, of the camera 500 may instruct the control unit as to which image capture mode to select. The arrays 506 may or may not concurrently capture the optical image, depending on the particular embodiment.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An imaging system comprising:
   an array of pixel sensors to, in response to selection of a first mode logarithmically integrate light between first successive initialization states of the array and not linearly integrate light between the first successive initialization states, and in response to a second mode linearly integrate light between second successive initialization states and not logarithmically integrate light between the second successive initialization states; and
   a mode control circuit to selectively place the array in one of the first and second modes.

2. The imaging system of claim 1, wherein the made control circuit comprises:

multiplexing circuitry adapted to generate a first indication to place the array in the first mode and generate a second indication to place the array in the second mode.

3. The imaging system of claim 1, wherein at least one of the pixel sensors comprises:

a photosensitive element; and a transistor coupled to the photosensitive element to cause the photosensitive element to furnish logarithmically encoded indications of light intensities in response to the first mode.

4. The imaging system of claim 1, wherein at least one of the pixel sensors comprises:

a photosensitive element; and a transistor coupled to the photosensitive element to cause the photosensitive element to furnish linearly encoded indications of light intensities in response to the second mode.

5. The imaging system of claim 1, wherein the imaging system comprises a camera.

6. A method comprising:

using an array of pixel sensors to logarithmically integrate light between first successive initialization states of the array without linearly integrating light between the first successive initialization states; and using the array of pixel sensors to linearly integrate light between second successive initialization states of the array without logarithmically integrating light between the second successive integration states.

7. The method of claim 6, further comprising: selecting one of the logarithmic integration and linear integration.

8. The method of claim 6, further comprising:

providing multiplexing circuitry to generate different indications to configure the array to integrate either linearly or logarithmically.

* * * * *

UNITED STATES PATENT AND TRADEMARK OFFICE
CERTIFICATE OF CORRECTION

PATENT NO. : 6,697,112 B1
DATED : February 24, 2004
INVENTOR(S) : Tonia G. Morris, Kevin M. Connolly and James E. Breisch It is certified that error appears in the above-identified patent and that said Letters Patent is hereby corrected as shown below:

Column 8,
Line 66, "made" should be -- mode --.

Signed and Sealed this

Twenty-second Day of June, 2004

JON W. DUDAS
*Acting Director of the United States Patent and Trademark Office*